| United States Patent [19] | [11] Patent Number: 4,861,663 |
|---|---|
| Sirinyan et al. | [45] Date of Patent: Aug. 29, 1989 |

[54] PROCESS FOR ANTISTATIC TREATMENT OR PRETREATMENT OF POLYAMIDES/POLYIMIDES, ANTISTATICALLY TREATED OR PRETREATED MATERIALS, AND THE USE THEREOF

[75] Inventors: Kirkor Sirinyan, Bergisch Gladbach; Hans-Joachim Laue, Krefeld; Rudolf Merten, Leverkusen; Dietrich Michael, Krefeld; Milan-Josef Tima, Roesrath, all of Fed. Rep. of Germany

[73] Assignee: Bayer Aktiengesellschaft, Leverkusen-Bayerwerk, Fed. Rep. of Germany

[21] Appl. No.: 73,567

[22] Filed: Jul. 15, 1987

[30] Foreign Application Priority Data

Jul. 25, 1986 [DE] Fed. Rep. of Germany ....... 3625188
Oct. 28, 1986 [DE] Fed. Rep. of Germany ....... 3636606

[51] Int. Cl.$^4$ .......................... B05D 3/02; B32B 5/14
[52] U.S. Cl. .................... 428/409; 427/302; 427/307; 427/322; 427/336; 427/353; 427/354; 427/393.1; 427/444; 428/922
[58] Field of Search ...................... 427/393.1, 354, 353, 427/336, 307, 302, 322, 444; 428/922, 409, 473.5, 477.7, 696, 697; 252/519, 518, 521; 524/911, 912

[56] References Cited

U.S. PATENT DOCUMENTS

| 3,423,314 | 1/1969 | Campbell | 427/393.1 |
|---|---|---|---|
| 3,438,805 | 4/1969 | Potrafke | 427/229 |
| 3,515,580 | 6/1970 | Eastes | 428/341 |
| 3,625,755 | 12/1971 | Potrafke | 427/477.7 |
| 4,093,775 | 6/1978 | Szur | 427/393.1 |
| 4,486,001 | 10/1984 | Cannady et al. | 428/922 |
| 4,698,259 | 10/1987 | Hervey | 427/393.1 |

FOREIGN PATENT DOCUMENTS

| 7316159 | 9/1969 | Japan | 427/393 X |
|---|---|---|---|
| 1053744 | 12/1981 | Japan | 428/922 |
| 0061127 | 4/1983 | Japan | 427/393.1 |

*Primary Examiner*—Janyce Bell
*Attorney, Agent, or Firm*—Connolly & Hutz

[57] ABSTRACT

The invention relates to a process for antistatic treatment or pretreatment for subsequent surface-coating of materials based on polyamides, polyimides or polyamideimides, where the molded articles of the material are treated with a solution of salt mixtures comprising (a) halides of elements of main groups 1 and/or 2 of the periodic system, in particular $CaCl_2$, $MgCl_2$, LiCl, NaCl and/or KCl and (b)
 (1) salts of weak inorganic bases with strong inorganic acids, in particular $AlCl_3$, $FeCl_3$, $TiCl_4$, $SbCl_5$, $CaCl_2$, $FeCl_2$, $CuCl_2$, $ZnCl_2$ and/or $MoCl_5$
 (2) and/or the chelate complexes of (b1) with Schiff bases, amines, carboxylic acids, diketones, $\alpha,\beta$-unsaturated ketones and phosphines, (c) in a non-corrosive, organic swelling agent or solvent for the materials mentioned, where appropriate with the addition of water, preferably in an alcohol, at temperatures up to the boiling point of the solvents, preferably at temperatures of from $-15°$ C. to $+60°$ C., for from 0.5 to 30 minutes, and the molded articles are washed with water or solvents and subsequently dried.

Antistatic molded articles treated by the process and molded articles pretreated for subsequent surface-coating, and the use thereof, are furthermore claimed.

11 Claims, 20 Drawing Sheets

PROCESS FOR ANTISTATIC TREATMENT OR PRETREATMENT OF POLYAMIDES/POLYIMIDES, ANTISTATICALLY TREATED OR PRETREATED MATERIALS, AND THE USE THEREOF

The invention relates to a process for antistatic treatment or pretreatment for subsequent surfacecoating of materials based on polyamides, polyimides or polyamideimides, where the moulded articles of the material are treated with a solution of salt mixtures comprising (a) halides of elements of main group 1 and/or 2 of the periodic system, in particular $CaCl_2$, $MgCl_2$, $BaCl_2$ $LiCl$, $NaCl$ and/or $KCl$
and (b)
(1) salts of weak inorganic bases with strong inorganic acids, in particular $AlCl_3$, $FeCl_3$, $TiCl_4$, $SbCl_5$, $CaCl_2$, $FeCl_2$, $CuCl_2$, $ZnCl_2$ $TiCl_3$, $BCl_3$, $SnCl_2$, and/or $MoCl_5$ (2) and/or the chelate complexes of (b1) with Schiff bases, amines, carboxylic acids, diketones, $\alpha,\beta$-unsaturated ketones and phosphines.

(c) in a non-corrosive, organic swelling agent or solvent for the materials mentioned, where appropriate with the addition of water, Representative swelling agents or solvents include low aliphatic or araliphatic (technical grade) alcohol, dimethyl formamide, dimethyl acetamide, dimethyl sulphoxide, ethylene glycol, and an ester of a low carboxylic acid or mixtures thereof. Alcohols are preferred swelling agents or solvents. The materials are added at temperatures up to the boiling point of the solvents, preferably at temperatures of $-15°$ C. to $+60°$ C. for 0.5 to 30 minutes, and the moulded articles are dried after washing with water or solvents.

Antistatic moulded articles, treated according to the process, and moulded articles pretreated for subsequent surface-coating, and the use thereof are furthermore claimed. In particular, such articles where the matrix or the surface of the polymer contains cations of the elements of Al, Fe, Ti, Sb, Sn, Zn, Fe, Co, Mo or mixtures thereof are claimed.

In general, organic, synthetic and natural polymers are electroinsulators. Their specific resistance is between $10^{10}$ and $10^{18} \Omega$. cm.

If specific polymers having a polyconjugated structure of the main chain are treated with strong oxidants or reducing agents, their specific resistance falls from about $10^9$ to about 10 $\Omega$. cm (see for example, "Organic Semiconductors, F. Gutmann and L. E. Lyons, John Wiley and Sons, Inc., New York (1967)). However, such conjugated polymers cannot be processed by methods which are conventional in plastics technology, such as injection moulding, extrusion and calendering, and are insoluble in common organic and inorganic solvents.

Another method of antistatic treatment in polymers is the addition of charge transfer complexes, for example based on tetrathiofulvalene or tetracyanoquinodimethane (cf., for example, DE-B 3,131,251), but the incorporation of these complexes into polymer matrices is very complicated and is therefore of no interest to the plastics-processing industry—apart from in very special cases.

It is furthermore possible to apply antistatic agents, for example ethoxylated fatty amines, long-chain phosphoric acid esters and long-chain paraffin salts, to the surface of a finished plastic article or to incorporate them directly into the polymer matrices during production. In the former case, a limited-term antistatic action is achieved due to the low adhesion of the antistatic agents, and in the second case, their incorporation in many cases impairs the original physical and chemical properties of the polymer material. It may be mentioned, in this connection, that the said antistatic agents have an antistatic action under very particular conditions, such as, for example, when the atmospheric humidity is sufficiently high.

DE-A-3,435,841 reveals that salts of sulphonic acids, as are produced on sulphonation of alkenylalkyl polyglycol ethers of the formula

$$R_1, -O\ (C_nH_{2n}O)\ R_2$$

using sulphur trioxide and subsequent hydrolysis, are suitable as antistatic agents for polyamides (PA). On the PA, the abovementioned antistatic agents, modified by $SO_3$ aftertreatment, have a useful action which, however, decreases due to external influences, such as low atmospheric humidity, or due to slight mechanical load or chemical attack over several weeks.

Furthermore, the literature, for example DE-A 3,409,462, reveals that thermoplastic mixtures based on polymeric compounds and pyrrole polymers which are polymerized using oxygen-containing oxidants are distinguished by their good electrical conductivity.

In this case also, the physical properties of the matrix polymer, such as impact strength and notched impact strength, and the tensile, expansion and elasticity behaviour, are impaired by the polypyrrole.

Furthermore, it may be mentioned that films which make pyrrole permeation or diffusion possible are pretreated on one side with pyrrole, and the absorbed pyrrole is then polymerized on the other side with the aid of aqueous $FeCl_3$ solution to form doped polypyrrole. This industrially very expensive process is limited to some materials which are very permeable towards pyrrole, such as nonwoven polypropylene etc., and leads to products having very high conductivity values of about 10-30 $\Omega^{-1}.cm^{-1}$ (see, for example, V. Bocchi and G. P. Gardini, J. Chem. Soc., Chem. Communications, p. 148 (1986)). However, as is known, such materials of good electroconductivity can be used in the antistatics field.

Furthermore, the literature reveals that polymer films which are coated with pyrrole and then aftertreated in an aqueous $FeCl_3$ bath have a surface conductivity in the range $10^{-1}$-$10^{-9}\Omega^{-1}.cm^{-1}$. In this aftertreatment, the coating of polypyrrole is produced either by vapour-deposition or by dipping in a mixture comprising a solvent and the pyrrole. The solvents employed for this purpose lead neither to swelling nor to partial roughening of the substrate surface.

Unfortunately, the coatings thus applied are neither abrasion-resistant nor adhesive. In addition, their antistatic action deteriorates very rapidly due to external influences, such as slight mechanical load or chemical attack.

The invention has the object of treating conventional polymeric materials, such as films, nonwoven fabrics, woven fabrics, fibres and injection-moulded parts etc., based on conventional polyamides/polyimides by subsequent treatment with a permanently antistatic, abrasion-resistant and highly adhesive medium without adversely influencing the mechanical and chemical properties of the polymeric base material.

The invention also has the object of a relatively gentle method for pretreating substrate surfaces of moulded articles made of synthetic polyamide/polyimide and/or polyamideimide for the subsequent application of adhesive surface coatings.

It is generally known that commercially available plastics have to be pretreated by washing, degreasing, sand-blasting, grinding, brushing, phosphatizing, passivating, fluatizing, flame-cleaning, picketing and etching, so that the surface coating applied in the next step adheres well to the substrate surface.

It is furthermore known that the abovementioned pretreatments customary for numerous plastic articles are unsuitable for polyamide substrates.

Direct application, without adhesion promoter, of technically interesting topcoats and varnishes to polyamide substrates is a problem still awaiting a satisfactory solution.

Only certain surface coatings based on, for example, vinylchloride copolymers, specifically of vinylchloride/vinylisobutyl ether or surface coating systems based on soluble copolyamides such as N-methoxymethyl-6,6 polyamide are distinguished by their good adhesion on polyamides. However, these surface coating films are softer and/or less resistant to solvents and scratching than the conventional coatings based on Desmodur ®/Desmophen ® (polyisocyanate) or on acrylate, polyester, nitrocellulose, acetobutyrate and epoxy resin.

It has therefore already been proposed (cf. brochure on "Desmodur/Desmophen Bayer-Lackstoffe [Desmodur/Desmophen Surface Coatings from Bayer], order no. LS 44427 of 5.86, Bayer AG, D-5090 Leverkusen), to clean polyamide plastic parts by means of aqueous cleaning agents in a so-called "power wash", to rinse and dry them, and to blow over ionizing air. The latter step avoids electrostatic charging of the surface of the plastic and largely prevents any associated susceptibility to dust accumulation.

In order to achieve adequate adhesion of the topcoat and varnish, technical polyamide plastic parts such as decorative wheel discs, door handles, wheel hubs, trims or bumpers are primed with a coating of adhesion promoter. Suitable primers which may be pointed out are, for example, type RR 2525/2B two-component (2-C) polyurethane primers of medium flexibility or conductive type RR 2526 2-component primers of high flexibility, supplied by Bayer AG, D-5090 Leverkusen, and the type R 2001 primers from Dr. Renger and Co., KG, D-8602 Strullendorf.

However, these methods, which are useful per se, have the disadvantage of requiring a relatively large number of process steps and the use of additional chemicals and, moreover, of adversely affecting the good optical properties such as brilliance and clarity and gloss of the topcoat, in many cases. Investigations to date have furthermore shown that the surface coatings applied in this manner in many cases fail to meet the high requirements of the alternating temperature test according to DIN 53,496.

Surprisingly, these objects are achieved in the process according to the invention by treating polymeric materials based on conventional polyamides, polyimides or polyamideimides with a solution of a mixture of (a) halides of elements of main groups 1 and 2 of the periodic system, in particular chlorides, especially $CaCl_2$ and/or $MgCl_2$ and/or KCl and/or LiCl and/or NaCl
with
(b)
(1) salts of weak inorganic bases and strong inorganic acids, in particular $FeCl_3$ and/or $AlCl_3$ and/or $TiCl_4$ and/or $TiCl_3$ and/or $BCl_3$ and/or $SnCl_2$ and/or $ZnCl_2$ and/or $CuCl_2$ and/or $MoCl_5$
(2) and/or the chelate complexes thereof of (b1) with Schiff bases, complex-forming amines, carboxylic acids, diketones $\alpha,\beta$-unsaturated ketones and phosphines,
(c) in a non-corrosive, organic swelling agent or solvent for the materials mentioned, where appropriate with the addition of water; preferably in a technical-grade alcohol, at temperatures up to the boiling point of the solvents (c), preferably at temperatures from $-15°$ C. to $+60°$ C., in particular $+15°$ C. to $+40°$ C., for from 0.5 to 30 minutes and the moulded articles are dried after washing with water or solvents.

Suitable halides (a) (fluorides, chlorides, bromides, iodides) of elements of main groups 1 and 2 are, in particular, the chlorides such as NaCl, KCl, $BaCl_2$; LiCl, $MgCl_2$ and $CaCl_2$ are preferred.

Suitable salts of weak bases and strong acids (1b) are, for example, sulphates, nitrates and in particular chlorides of metals of main and subgroups 3 and 4 and of base metals of subgroups 6–8, and of zinc or copper. $SnCl_2$, $AlCl_3$, $TiCl_3$, $TiCl_4$, $BCl_3$ and, in particular, $FeCl_3$ are preferred.

These salts (b1) (essentially their metal ions of (b1)) may also be used in the form of chelate complexes (b2). Mixtures of LiCl, $MgCl_2$, $CaCl_2$ or $BaCl_2$ with $FeCl_2$, $FeCl_3$, $TiCl_3$, $TiCl_4$, $BCl_3$, $AlCl_3$ or $SnCl_2$ are particularly preferably used, and mixtures of $CaCl_2$ and $FeCl_3$ are very particularly suitable.

Suitable swelling agents and solvents are those described in conventional handbooks on polyamides (c.f., e.g. "Die Polyamide" [The Polyamides] by Hopff, Muller, Wegner, Springer-Verlag (1954), and the "Polymer Handbook" by Brandrup et al., New York, volume IV (1975)). Suitable solvents are, for example, primary, secondary or tertiary alcohols with 1 to 8 carbon atoms, primary and/or secondary alcohols with 1 to 4 carbon atoms being preferred. Examples which may be mentioned are the preferred low aliphatic and araliphatic (technical-grade) alcohols, e.g. methanol, ethanol, isopropanol, n-propanol, n-butanol, isobutanol, tert.-butanol benzyl alcohol and phenylethyl alcohol. Methanol and ethanol are particularly preferred. Glycols such as ethylene glycol and/or esters of low carboxylic acids such as butyl acetate or dimethylsulphoxide, and amide-containing solvents such as formamide and dimethylformamide or dimethylacetamide, are also suitable. Mixtures of these solvents can of course also be used. It is also possible to add water (in amounts of, preferably, 0 to 40% by weight, based on the solvent/water mixture) to the solvents (c).

If desired, it is also possible to add customary polyamide plasticizers (0.2–10% by weight, preferably 0.5–5% by weight, based on the entire amount of liquid). Examples which may be mentioned are N-monoethyl benzenesulphonamide acid, p-toluenesulphonamide, dioxidiphenylsulphone and dibenzylphenol, lactams such as γ-butyrolactam, α-pyrrolidone, lactones and tetrahydrofurfuryl alcohol-carboric esters (c.f., for example, R. Vieweg, Kunststoff-Handbuch [Plastics Handbook], volume VI, Carl Hanser Verlag, Munich (1966)).

In order to reduce the swelling effect of the solutions according to the invention, inert solutions such as water, glycols such as ethylene glycol and/or esters of low carboxylic acids, e.g. butyl acetate, in amounts of 0.1 to 40% by weight, preferably in amounts of up to 30% by weight, may be added, where appropriate, to the solutions.

The total amount of the salt mixtures (a+b) to be used according to the invention is preferably 2.5–25% by weight (particularly preferably 5–15% by weight), based on the amount of solution. The amount of salts of weak bases (b1) should not exceed 30% by weight (based on the total amount of salt (a+b), which may increase up to the particular solubility limit).

As already mentioned the metal complex compounds (metal chelates (b2)), in particular of the elements of Al, Fe, Ti, Sb, Mo and Cu, can also be used for carrying out the process. We have observed that such complex compounds (b2) of the abovementioned elements based on diketones such as pentane-2,4-dione, unsaturated ketones such as mesityl oxide, aromatic and/or aliphatic Schiff bases, aliphatic and aromatic amines or carboxylic acids such as ascorbic acid are suitable. Aromatic or (cyclo)aliphatic phosphines such as triphenylphosphine or tributylphosphine may be mentioned as other complex ligands suitable for carrying out the process.

In general, the materials/moulded articles are treated at from −15° C. to the boiling point of the solvents used, preferably at 15° C. to 40° C., especially at room temperature, i.e. 17° C. to 25° C. Treatment lasts in general between 0.5 and 30 minutes, preferably for from 1 to 15 minutes, especially preferably 3 to 7.5 minutes. Treatment may also preferably be carried out under the influence of ultrasound.

A further process version comprises treating the materials for the antistatic finish with a mixture consisting of an (additional) commercially available anti-static agent and the halogen salt-containing, preferably alcoholic solvent system according to the invention.

Suitable antistatic agents are long-chain $C_8$–$C_{35}$ paraffinsulphone salts, quaternary ammonium salts, such as tetrabutylammonium chloride, tetramethylammonium bromide, diethyldibutylammonium sulphate, tricaprylmethylammonium chloride and tetracaprylmethylammonium bromide, water-soluble salts of the sulphonic acids $RSO_3Na$, where R represents a straight-chain alkyl radical having 8–30 C atoms, preferably having $C_8$–$C_{12}$ atoms, and furthermore alkenylalkyl polyglycol ethers. In the case of alkyl glycol polyglycol ethers of the formula $$R_1—O—(C_nH_{2n}—O)_x—R_2$$

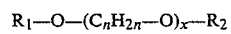

$R_1$ denotes H or a straight-chain alkenyl radical having 8–35 C atoms,
  $R_2$ denotes H or an alkyl radical having 1–12 C atoms, and
  n denotes an integer from 2 to 4, while
  x can adopt values from 0 to 35.

Preferred polyethers are those where n=2 and/or 3 and having molecular weights from 150 to 5000.

Furthermore suitable for carrying out the process are salts of such sulphonic acids in whose starting material R has an unsaturated fatty alkyl radical and, as cation, alkali metal, alkaline-earth metal, ethanolammonium, diethanolammonium and triethanolammonium ions. Furthermore, phosphine oxides of the general formula

such as described, for example, in US-A-3,709,852, preferably decyl/hexyl/octyl phosphine oxides (as described, for example, in EP-A-0,134,482) can be used for carrying out the process.

The total amount of the antistatic agents in the mixture according to the invention (based on solids) is preferably 0.2 to 10% by weight, particularly preferably 0.5 to 5% by weight, very particularly preferably 1.0 to 2.5% by weight. These antistatic agents are preferably concomitantly used in the treatment, according to the invention, of the materials for antistatic finishing; in the pretreatment, according to the invention, for adhesive surface-coating, addition of these (customary) antistatic agents is generally dispensed with.

The solvents in the treatment baths according to the invention of course have to be selected so that they have no dissolving effects (e.g. in the case of certain polyamides) or reduce the mechanical properties of the moulded articles (e.g. impact and notched impact strength). The average skilled worker in this field can select suitable solvents for the particular polyamide/imide without difficulty.

When carrying out the process in practice, a procedure is expediently followed in which the polyamide moulded article is dipped into the treatment system according to the invention, removed from the bath after 0.5–30 minutes and freed of adhering solvent.

In general, the solvent is removed by evaporation, if appropriate under reduced pressure. Higher-boiling solvents are expediently removed by extraction or rinsing with low-boiling solvents.

The process according to the invention can be used on all (in particular commercially available) aromatic and/or aliphatic types of polyamides, in particular semi-crystalline types, such as polyamide 6, polyamide 6,6, polyamide 10, polyamide 11 and polyamide 12, and also copolyamides.

The process can be used on aromatic and (cyclo)aliphatic polyamides or copolyamides and polyamide-imides, such as Kevlar ® and Kapton ® types. Polyamides, polyimides and polyamide-imides containing fillers or not containing fillers can be treated equally successfully.

It may be mentioned, without limiting the scope of the process according to the invention, that polyamides containing, as fillers, minerals such as talc, chalk, wollastonite, $CaF_2$, kaolin; carbon blacks and customary coloured pigments and oxides such as titanium dioxide and aluminium oxide and reinforcing materials such as glass, carbon and aramide fibres or mats, and mixtures of these with one another, are very suitable.

Depending on the proportion, admixtures of fillers shorten the time necessary for treating the unfilled material.

Moreover, toughened polyamide types which contain the modifiers and auxiliaries known in the state of the art (such as, e.g., natural rubber-, synthetic polyisoprene, polybutadiene, polyisobutylene, polyacrylate rubber types, polystyrene/polybutadiene copolymers, EPDM elastomer types, ethylene/vinylacetate copolymers or mixtures thereof or grafted polymers or copolymers, are very suitable for carrying out the process.

Cocondensates of the said polyamides with further polymers (such as, e.g., 2,6-dimethylpolyphenylene oxides, polyphenylene sulphides, polyesters such as polybutylterephthalate, halogenated and halogen-free polycarbonates, polystyrene, aromatic imides, aliphatic and/or aromatic amideimides and mixtures thereof) are furthermore suitable for carrying out the process.

When the process is used for pretreatment of the of the material surface to produce surface coatings with good adhesion it is possible to use all customary, commercially available one-component and multi-component surface coating systems, both topcoat and varnish systems, which can be dried by physical and chemical means, and can be cured by electron beams or light rays or by heat. Without limiting the scope of the invention customary DD surface coatings, alkyl surface coatings, melamine resin surface coatings, saturated ester resins, curing, non-curing and vinyl-modified alkylde resins, urea resins, melamine resins, phenolic resins, non-curing phenolic resins (novolaks), TSA (thermosetting acrylates) surface coatings, CAB (cellulose/acetobutyrate) surface coatings, NC (nitrocellulose) surface coatings, rubber-, silicone-, polyol-, amine- and polyamide-containing surface coating systems and their mixtures and cocondensates with one another, are pointed out (see, for example, H. Kittel, Lehrbuch der Lacke und Beschichtungen [Textbook of Surface Coatings and Coatings], volume IV, page 76-306, published by W. A. Colomb (1976)). The abovementioned surface coatings can of course be employed in the form of molecular solutions, dispersions, suspensions or colloidal systems for carrying out the process according to the invention. Suitable solvents are both polar (such as alcohols, water and ketones) and non-polar solvents (such as 1,1,1-trichloroethane, perchloroethylene, naphtha and petroleum ether).

Low-solvent or solvent-free two-component coating systems such as EP (epoxy resin) surface coatings, unsaturated UP (polyester) surface coatings, polyurethane (PU) surface coatings, polyacrylate and polymethacrylate systems (cf., for example, H. Kittel, Lehrbuch der Lacke und Beschichtungen [Textbook of Paints and Surface Coatings], volume IV, page 328-358, published by W. A. Colomb (1976)) and their mixtures with one another, are preferably used for carrying out the process.

For carrying out the process for the production of adhesive surface coatings on the materials pretreated according to the invention it is of course possible to use surface-coating systems which contain additional substances such as pigments, binders, surfactants, oxides, minerals and reinforcing materials or plasticizers and other auxiliaries such as antioxidants, fungicides and UV absorbers (cf. H. Kittel, Lehrbuch der Lacke und Beschichtungen [Textbook of Paints and Surface Coatings], volume VIII, part 2 page 440-531, published by W. A. Colomb (1980)). Customary surface coating systems containing metallic pigments based on aluminium bronze, chromium, iron, nickel, cobalt, zinc and manganese are particularly suitable.

The application of surface coatings on the polyamide materials pretreated according to the invention can be carried out by the customary methods such as painting, roller-coating, dipping, flow-coating, casting, spray-coating, airless spraying, silkscreen printing, electrostatic and thermal spraying processes or by the electroosmosis or electrolysis process.

The layer thicknesses of surface coatings may be varied from 0.01 to several hundred μm.

The surface coatings, when applied to polyamide surfaces pretreated by the novel process, are distinguished by their excellent peel resistance and are very resistant in the alternating temperature test according to DIN 53,496 and the condensation test according to DIN 50,017. The peel resistance values of the surface coatings measured by the method of DIN 53,151 are within the range of GtO (very good).

The invention thus also relates to polyamide moulded articles having an adhesive surface coating without primer, pretreated by the process, according to the invention, of Claim 1, and containing non-pigmented or pigmented base and/or topcoats.

The moulded articles pretreated by the process in general possess—besides a change in the surface structure—cations of the abovementioned elements, preferably Al, Ca, Ti, Sb, Sn, Zn, Fe and/or Cu and as well as, where appropriate, halide anions or complex ligands.

Applications for the polyamide moulded articles treated/constructed according to the invention are to be found in, for example, the domestic, electrical, electronics, office, automobile, airplane, mining and equipment areas, both in the form of antistatic moulded articles and as surface-coated moulded articles.

EXAMPLE 1

A 90×100×3 (mm) thick glass fibre-reinforced (30% by weight) plastic plate made from polyamide 6 is treated in an antistatic bath which contains 125.0 g of $CaCl_2$ (component a)
15.0 g of $FeCl_3$ (component b)
1400 ml of methanol (component c)
400 ml of distilled $H_2O$
2.0 g of benzyldodecyldimethylammonium chloride (customary antistatic agent) for 5 minutes at room temperature (RT), subsequently washed with distilled water and dried at 80° C. for 120 minutes.

A permanently antistatically treated polymer plate having a surface resistance of $3.10^8 \Omega$ cm and a half-value period of 2 seconds is obtained.

The surface resistance $R_{SR}$ was determined according to DIN 53,482 and the half-value period according to DIN 53,486. Impact strength studies according to DIN 53,453/ISO R 173 show that its impact strength is not affected by the antistatic treatment process.

EXAMPLE 2

An injection-moulded part made from rubber-modified polyamide 6 is treated in a solution comprising 1500 ml of methanol
125.0 g of $CaCl_2$
4.0 g of $TiCl_4$ for 10 minutes at room temperature, and then washed with distilled $H_2O$ and dried for 3 hours at 110° C.

A permanently antistatically treated polymer plate having a surface resistance of $10^8\Omega$. cm, determined according to DIN 53,482, and a half-value period of 1.5 seconds, determined according to DIN 53,486, is obtained. The impact strength or notched impact strength of the material is not affected by the treatment process.

EXAMPLE 3

A 90×150×3 (mm) thick injection-moulded plastic plate made from a commercially available polyamide 6,6 is treated in a solution comprising
  1500 ml of ethanol,
  110.0 g of $CaCl_2$
  19.0 g of $FeCl_3$
for 3 minutes at room temperature, washed for 1 minute with distilled water and subsequently dried for 30 minutes at 110° C. A permanently antistatic plate is obtained. The moulded article antistatically treated in this fashion was subjected to a modified thermal cycling test according to DIN 53,496, the heat storage occurring at +110° C. and the cold storage at −40° C. The "antistatic coating" adheres to the moulded article surface or to the moulded article matrix so strongly that it exhibits no change. The impact strength or notched impact strength is not affected by the antistatic treatment.

EXAMPLE 4

A moulded part made from a polyamide 6 reinforced with 40% by weight of mineral fibres is treated in a solution comprising
  100.0 g of LiCl
  19.0 g of $FeCl_3$
  1000 ml of n-butanol
  5.0 g of benzyltriethylammonium chloride for 8 minutes at 30° C., rinsed according to Example 1 and subsequently dried.

A permanently antistatically treated moulded article whose surface resistance $R_{SR}$ according to DIN 53,482 is $7.10^7\Omega$.cm and half-value period according to DIN 53,486 is 0.9 second is obtained.

EXAMPLE 5

A 90×150×3 mm thick plastic plate made from polyamide 6 containing 30% of rubber is treated in an antistatic bath which contains
  100.0 g of $CaCl_2$
  17.5 g of $FeCl_3$
  1000 ml of isopropanol
  200.0 ml of distilled $H_2O$
  8.0 g of tetraethylene glycol dimethyl ether for 12.5 minutes at RT, subsequently rinsed in distilled water and dried overnight at 50° C.

A permanently antistatically treated polymer plate having a surface resistance of $10^7\Omega$.cm and a half-value period of ∼1.5 seconds is obtained.

EXAMPLE 6

A 90×150×3 (mm) thick glass fibre-reinforced (30% by weight) plastic plate made from polyamide 6 is treated in an antistatic bath which contains
  125.0 g of $CaCl_2$
  17.0 g of $SnCl_2$
  1500 ml of methanol
  400 ml of distilled $H_2O$
  8.0 g of octadecylamine
for 8 minutes at 35° C., washed with distilled water and subsequently dried overnight at 80° C.

A permanently antistatic and abrasion-resistant material is obtained. This material was subjected to a modified thermal cycling test according to Example 3. The "antistatic coating" adheres to or on the moulded article surface so strongly that it exhibits no change.

EXAMPLE 7

A 100×100×0.5 (mm) thick transparent plastic plate made from polyamide 6 and polyamide 11 is treated in a bath comprising
  80.0 g of $CaCl_2$
  25.0 g of $AlCl_3$
  1000 ml of n-butanol
  14.0 g of octadecylsulphonic acid, Na salt for 19 minutes at RT, and subsequently dried according to Example 1.

A transparent permanently antistatically treated polymer film having a surface resistance of $10^6\Omega$.cm, determined according to DIN 53,482, and a half-value period of ∼1.3 seconds, determined according to DIN 53,486, is obtained.

EXAMPLE 8

A 100×100×0.8 mm thick, glass mat-reinforced, coextruded plastic plate made from polyamide 6 and polyamide 11 is treated in a bath comprising
  140.0 g of $CaCl_2$
  25.0 g of $FeCl_3$
  150 ml of $H_2O$
  1500 ml of methanol
for 9 minutes at 30° C., washed and subsequently dried according to Example 1.

A permanently antistatically treated plastic plate having a surface resistance of $10^8\Omega$.cm and a half-value period of 2 seconds is obtained. The "antistatic coating" adheres to the moulded article surface or to the moulded article matrix so strongly that, in spite of being stored for several days in distilled water at RT, it exhibits no change. Further studies show that the physical properties, such as tensile expansion or modulus of elasticity, of the polymer material are not affected by the antistatic treatment.

EXAMPLE 9

A 100×100×0.9 mm thick, wollastonite-reinforced polyamide 6 plate is treated in a bath comprising
  150.0 g of $CaCl_2$
  29.0 g of $Fe^{III}$ acetylacetonate
  3.0 g of tetraethylene glycol dimethyl ether
  150 ml of ethylene glycol
  100 ml of $H_2O$
for 10 minutes at 65° C., washed with distilled $H_2O$ and subsequently dried according to Example 1.

A permanently antistatically treated plastic plate having a surface resistance of $10^8\Omega$.cm and a half-value period of 1.5 seconds is obtained. The "antistatic coating" adheres to the moulded article surface so strongly that it passes the adhesion test according to DIN 53,151 with Gt.0.

EXAMPLE 10

A 100×100×0.8 mm thick polyamide plate according to Example 9 is treated in a bath comprising
  125.0 g of $CaCl_2$
  38.0 g of FeIII complex of the Schiff's base based on benzaldehyde and aniline (see preparation, for example, P. S. Zacharias et al., Indian J. Chemistry, 24A, 936 (1985))

1000 ml of methanol/100.0 ml of H$_2$O are treated for 12 minutes at RT, washed and subsequently dried according to Example 1.

A permanently antistatically treated plastic plate having a surface resistance of 10$^8$Ω.cm and a half-value period of 2 seconds is obtained.

EXAMPLE 11

A polyamide plate according to Example 5 is treated in an antistatic medium which contains
1000 ml of ethanol
100.0 g of KCl
20.0 g of Fe III complex of the Schiff's base based on aniline and salicylaldehyde (see preparation, for example, P. S. Zacharias et al., Indian J. Chemistry, 24A, 936 (1985))
for 12.5 minutes at RT, washed and subsequently dried according to Example 1.

A permanently antistatically treated plastic plate having a surface resistance of 10$^7$Ω.cm is obtained. The half-value period for the discharge is ~1.5 seconds.

EXAMPLE 12

A moulded part according to Example 4 is treated in a solution comprising
1000 ml of n-propanol
100.0 g of CaCl$_2$
30.0 g of tetrabutyl titanate
2.0 g of tetrabutylammonium bromide
for 15 minutes at RT, washed with H$_2$O and subsequently dried according to Example 1. A permanently antistatically treated plastic plate having a surface resistance of 10$^8$Ω.cm and a half-value period of ~2 seconds is obtained. The "antistatic coating" adheres to the moulded article surface so strongly that it passes the adhesion test according to DIN 53,151 with Gt0-Gt1.

EXAMPLE 13

A polyamide plate according to Example 6 is treated in an antistatic bath comprising
1000 ml of n-butanol
100.0 ml of distilled H$_2$O
19.0 g of 5-methyl-5-hexene-2,4-dione FeCl$_3$ complex (see preparation, for example, M. T. Teyssie et al., J. Polym. Sci. 50, 154 and 253 (1961))
for 8 minutes at RT, washed with distilled H$_2$O and subsequently dried for 60 minutes in a drying cabinet at 90° C. A permanently antistatically treated plastic plate having a surface resistance of 10$^7$Ω.cm and a half-value period of 1.5 seconds is obtained. The "antistatic coating" adheres to the moulded article surface so strongly that it passes the adhesion test according to DIN 53,151 with Gt1.

EXAMPLE 14

A 105×145×3 mm non-reinforced injection-moulded plastic plate made from polyamide 6 is pretreated in a bath which contains
68.5 g of CaCl$_2$,
1.5 g of AlCl$_3$,
0.75 g of Li dodecylbenzenesulphonic acid salt of
775 ml of ethanol,
225 ml of (technical grade) distilled water,
for 15 minutes at room temperature, washed with distilled H$_2$O, dried at 80° C. for 10 minutes. An antistatically treated and water-wettable polyamide plate is obtained.

The plate pretreated in this manner is subsequently sprayed, without primer, with a conventional metallic-CAB (cellulose acetobutyrate)/acrylate base coat (Permacon ®-metallic-pore filler from Spies-Hecker GmbH, 5000 Cologne 51) which predominantly consists of aluminium powder, binder and solvent, and is dried at RT.

A surface-coated plastic having a metallic effect is obtained. The surface coating adheres to the substrate surface so strongly that it passes the cross-cut test according to DIN 53,151 with Gt-0 (very good). Furthermore, the abovementioned plate passes, without problems, the alternating temperature test according to DIN 53,496 and passes, without problems, the condensation test according to DIN 50,017, with "very good".

COMPARISON EXAMPLE 1

A polyamide 6 plate according to Example 14 is cleaned in a "power wash", rinsed, dried, blown with ionizing air (c.f. brochure on "Desmodur/Desmophen Bayer-Lackrohstoffe" [Desmodur/Desmophen Surface Coating Raw Materials from Bayer], order no. LS 44427 of 5.86, Bayer AG, D-5090 Leverkusen) and subsequently provided with the surface coating mentioned in Example 14. The result is a surface-coated polyamide plate. The adhesion of the surface coating to the polyamide surface is so poor that it does not pass the cross-cut test according to DIN 53,151 (Gt-5 very poor). Furthermore, the plate does not pass either the thermal cycling test according to DIN 53,496 or the damp heat test according to DIN 50,017.

EXAMPLE 15

A 105×145×3 mm reinforced injection-moulded plastic plate made from polyamide 6,6 is pretreated in a bath which contains
70.0 g of CaCl$_2$,
1.5 g of Fe$^{3+}$-acetylacetonate,
750 ml of ethanol,
250 ml of distilled water,
at room temperature for 10 minutes, washed with distilled water in an ultrasonic bath and dried at room temperature. An antistatically treated and water-wettable polyamide plate is obtained.

This plate is subsequently provided directly with a metallic surface coating as described in Example 14.

A surface-coated plastic having a metallic effect is obtained. The surface coating adheres very well to the substrate surface. It passes the cross-cut test according to DIN 53,151 with Gt-0 (very good). Furthermore, the surface coating passes both the alternating temperature test according to DIN 53,496 and the condensation test according to DIN 50,017 without any problems with "very good".

COMPARISON EXAMPLE 2

A non-reinforced polyamide 6,6 plate according to Example 15 is cleaned in a "power wash", rinsed, dried, blown with ionizing air (c.f. brochure on "Desmodur/Desmophen" Bayer-Lackrohstoffe [Desmodur/Desmophen Surface Coating Raw Materials from Bayer], order no. LS 44427 of 5.86, Bayer AG, D-5090 Leverkusen) and subsequently provided with the surface coating indicated in Example 14. The adhesion of the surface coating on the polyamide surface is so poor that it does not pass the cross-cut test according to DIN 53,151 (Gt-5 very poor). Furthermore, the plate does not pass either the alternating temperature test according to DIN 53,496 or the condensation test according to DIN 50,017.

EXAMPLES 16 AND 17

In each case one 105×145×3 mm glass fibre-reinforced (~25%) plastic plate made from polyamide 6 or from polyamide 6,6 is pretreated in a bath which contains from
  75 g of $CaCl_2$
  1.0 g of $AlCl_3$
  700 ml of methanol,
  250 ml of distilled water,
for 20 minutes at ~40° C., washed with distilled water, dried, blown with ionizing air and subsequently provided directly with the surface coating described in Example 14.

Surface-coated polyamide plates showing excellent adhesion are obtained. The coatings pass the cross-cut test according to DIN 53,151, the alternating temperature test according to DIN 53,496 and the condensation test according to DIN 50,017 with "very good" without any problems.

COMPARISON EXAMPLES 3 AND 4

In each case a 105×145×3 mm glass fibre-reinforced (~25% by weight) plastic plate made from polyamide 6 or polyamide 6,6 according to Examples 16, 17 is cleaned in a "power wash", rinsed, dried blown with ionizing air and subsequently provided with a surface coating described in Example 14. The adhesion of the surface coating on the polyamide plates is so poor that it does not pass the tests according to DIN 53,151, DIN 53,496 and DIN 50,017.

EXAMPLES 18 AND 19

In each case a 105×145×3 mm mineral-reinforced plastic plate made from polyamide 6 or polyamide 6,6 are each treated for 10 minutes in a bath which consists of
  1000 ml of isopropanol
  150 g of $CaCl_2$
  3.5 g of $Fe^{3+}$ Schiff base complex (based on 1,2-diaminobenzene and bissalicylaldehyde)
at 50° C., washed with ethanol (technical grade), dried at 80° C. for 10 minutes. An antistatically treated and water-wettable polyamide plate is obtained.

The plate thus pretreated is subsequently provided, without primer, with a commercially available filler-free 2-component varnish based on polyisocyanate (Desmodur ®/Desmophen ®) and polyol, mainly consisting of polyether, polyester and polyacrylate (of type RR 2579— standard formulation of Bayer AG, D-5090 Leverkusen), and dried at room temperature in the course of 40 minutes.

A surface-coated plate is obtained. The surface coating adheres so well to the plate surface that it passes the tests according to DIN 53,151, DIN 53,496 and DIN 50,017 with very good without any problems.

COMPARISON EXAMPLES 5-6

In each case a 105×145×3 mm mineral-reinforced plastic plate made from polyamide 6 or polyamide 6,6 is precleaned in accordance with Comparison Example 1 and subsequently surface-coated according to Examples 5-6. The adhesion of the surface coating on the polyamide plates is so poor that it does not pass the tests according to DIN 53,151, DIN 53,496 and DIN 50,017.

EXAMPLES 20 AND 21

In each case a 105×145×3 mm plastic plate toughened with rubber particles (30%) and made from polyamide 6 or polyamide 6,6 is treated for 6 minutes in a bath which consists of
  800 ml of methanol,
  60 g of $CaCl_2$,
  1.0 g of $AlCl_3$,
  1.5 g of tetrabutylammonium bromide
at 20° C., washed with distilled water. Antistatically treated and water-wettable polyamide plates are obtained.

The plates thus pretreated are subsequently sprayed, without primer, directly with a commercially available automobile stove enamel based on alkyl melamine resins (type Alpine White from Hellac GmbH, D-3330 Helmstedt) at 40° C., and subsequently dried at 80° C. for 20 minutes.

A plate with an adhesive surface coating is obtained. The surface coating adheres so well to the plate surface that it passes the tests according to DIN 53,151, DIN 53,496 and DIN 50,017 with "very good" without any problems.

COMPARISON EXAMPLES 7 AND 8

In each case a 105×145×3 mm plastic plate toughened with rubber particles (~30%) and made from polyamide 6 or polyamide 6,6 according to Examples 20 and 21 is precleaned according to Comparison Example 1 and subsequently provided with a surface coating described in Example 20 and 21.

The adhesion of the surface coating is so poor (Gt-5 according to DIN 53,151) that it does not pass either the condensation test according to DIN 50,017 nor the alternating temperature test according to DIN 53,496.

EXAMPLES 22 AND 23

In each case a 105×145×3 mm mineral- or glass fibre-reinforced plastic plate made from polyamide 6 or polyamide 6,6 is pretreated according to Example 14 and subsequently provided with a metallic surface coating in accordance with Example 14.

Plastic samples having a metallic effect are obtained. The adhesion of the surface coating is so good that it passes the tests according to DIN 53,151, DIN 53,496 and DIN 50,017 with "very good" without any problems.

EXAMPLE 24

A 90×150×3 mm plastic plate made from rubber-modified and glass fibre-containing polyamide 6 is pretreated for 10 minutes in a bath which contains
  68.5 g of $CaCl_2$,
  1.9 g of $AlCl_3$,
  750 ml of ethanol (technical-grade),
  225 ml of distilled water,
at room temperature, washed with distilled water in an ultrasonic bath for 5 minutes, dried blown with ionizing air and subsequently provided with a surface coating according to Example 16. A plastic sample having an adhesive surface coating is obtained. The adhesion of the surface coating is so good that it passes the cross-cut test with Gt-0 (very good). Furthermore, the surface coating passes the tests according to DIN 53,496 and DIN 50,017 without any problems.

EXAMPLE 25

A 90×150×3 mm plastic plate made from a commercially available polyamide 6,6 with 30% by weight of glass fibres is treated for 5 minutes in a bath consisting of 120 g of $CaCl_2$,
20 g of $MgCl_2$,
3 g of $FeCl_3$,
20 ml of p-toluenesulphonamide,
1500 ml of ethanol, at room temperature, dried at room temperature and subsequently provided with a surface coating according to Example 14. A surface-coated material showing very good adhesion of the surface coating (Gt-0 according to DIN 53,151) is obtained.

We claim:

1. Process for antistatic treatment or pretreatment of a polymeric material based on a polyamide, a polyimide or a polyamideimide, characterized in that the polymeric material is first treated with a solution consisting essentially of
    (a) halides of elements of main groups 1 and 2 of the periodic
       system of the elements with
    (b)
       (1) salts of weak inorganic bases and strong inorganic acids
       (2) or the chelate complexes of (b1) with a Schiff base, a complex-forming amine, a carboxylic acid, a diketone, an α,β-unsaturated ketone, or mixtures of (b1) and (b2)
    or mixtures of (a) and (b) in
    (c) a non-corrosive, organic swelling agent or solvent for the materials mentioned;
    at temperatures up to the boiling point of the organic swelling agent or solvent (c), for from 0.5 to 30 minutes, and then washed with water or solvents and dried.

2. Process according to claim 1, characterized in that the proportion of salts of weak bases (b1) does not exceed 30% by weight in the total amount of salts (a+b1).

3. Process according to claim 1, characterized in that chlorides are used as halides (a).

4. Process according to claim 1, characterized in that sulphates, nitrates or chlorides of metals of main and subgroups 3 and 4 of the periodic system of the elements, of base metals of subgroups 6 and 8 of the periodic system of the elements, of combinations thereof, of zinc or of copper are used as salts of weak bases (b1).

5. Process according to claim 1, characterized in that mixtures of $CaCl_2$, $MgCl_2$, $BaCl_2$, KCl, NaCl or LiCl with $FeCl_3$, $TiCl_3$, $TiCl_4$, $BCl_3$, $AlCl_3$, $FeCl_2$, $SbCl_5$, $MoCl_5$, $ZnCl_2$, $CuCl_2$ or $SnCl_2$ are used.

6. Process according to claim 1, characterized in that the swelling agent or solvent (c) used is a low aliphatic or araliphatic (technical-grade) alcohol, dimethylformamide, dimethyl acetamide, dimethylsulphoxide, ethylene glycol, an ester of a low carboxylic acid or mixtures thereof.

7. Process according to claim 1, characterized in that chelate complexes (b2) of salts of weak bases (b1) with a Schiff base, a diketone, an α,β-unsaturated ketone, ascorbic acid, a phosphine or mixtures thereof in a technical-grade alcohol are used.

8. Process according to claim 1, characterized in that 0.2 to 10% by weight of a plasticizer, 0.2 to 10% by weight of an antistatic agent or mixtures thereof are admixed with the solution.

9. A moulded article which has been antistatically treated or pretreated for adhesive surface-coating, made from a material based on a polyamide, a polyimide or a polyamideimide according to claim 1, characterized in that the matrix or the surface of the polymer contains cations of the elements of Al, Fe, Ti, Sb, Sn, Zn, Fe, Cu, Mo or mixtures thereof.

10. Process according to claim 6, where the swelling agent or solvent (c) contains water in an amount up to 40% by weight, based on the total weight.

11. Process according to claim 7 where the technical-grade alcohol is technical-grade methanol.

* * * * *